United States Patent
Keel et al.

[11] Patent Number: 6,125,010
[45] Date of Patent: Sep. 26, 2000

[54] MO-AU GOLD SEEDLAYER IN THIN FILM HEADS

[75] Inventors: Beat G. Keel, Prior Lake; Frank E. Stageberg, Edina, both of Minn.

[73] Assignee: Seagate Technology LLC, Scotts Valley, Calif.

[21] Appl. No.: 08/188,078

[22] Filed: Jan. 27, 1994

Related U.S. Application Data

[63] Continuation-in-part of application No. PCT/US93/11571, Nov. 23, 1993.

[51] Int. Cl.⁷ .................................................... G11B 5/127
[52] U.S. Cl. .............................................................. 360/126
[58] Field of Search ...................... 360/126, 119, 360/123, 125; 156/643

[56] References Cited

U.S. PATENT DOCUMENTS

| | | | |
|---|---|---|---|
| 4,103,315 | 7/1978 | Hempstead et al. | 360/110 |
| 4,716,484 | 12/1987 | Kaminaka et al. | 360/126 |
| 4,780,781 | 10/1988 | Sano et al. | 360/126 |
| 4,912,584 | 3/1990 | Mallary et al. | 360/126 |
| 5,059,278 | 10/1991 | Cohen et al. | 360/123 |
| 5,333,086 | 7/1994 | Frey et al. | 360/126 |
| 5,375,023 | 12/1994 | Ju et al. | 360/126 |

FOREIGN PATENT DOCUMENTS

| | | |
|---|---|---|
| 0 114 076 | 7/1984 | European Pat. Off. . |
| 0 301 823 A3 | 2/1989 | European Pat. Off. . |
| 0 332 320 | 9/1989 | European Pat. Off. . |
| 0 387 143 | 9/1990 | European Pat. Off. . |
| 28 33 249 A1 | 2/1980 | Germany . |
| WO 85 02706 | 6/1985 | WIPO . |
| WO 89/05505 | 6/1989 | WIPO . |

OTHER PUBLICATIONS

IBM Technical Disclosure Bulletin, vol. 35, 1B, Jun. 1992.

J. Appl. Phys. 64(3), Aug. 1, 1988, "Magnetic Anisotropy in Ni/Fe Artificial Lattice Film".

Patent Abstract of Japan, vol. 8, No. 129, (p–280)(1566), Jun. 15, 1984 re: Japan Publication No. JP59033613, (Fujitsu K.K.) Feb. 23, 1984.

*Primary Examiner*—Jefferson Evans
*Attorney, Agent, or Firm*—Kinney & Lange, P.A.

[57] ABSTRACT

A thin film head and a method for fabricating the same comprises depositing a first non-magnetic seedlayer on a substrate, forming a bottom portion of a magnetic core on the first non-magnetic seedlayer, depositing a second non-magnetic seedlayer and forming a top portion of the magnetic core on the second non-magnetic seedlayer. A gap comprised of non-magnetic material is formed between the top and bottom portions of the magnetic core. The stability of the thin film head while in a relaxed state and its read performance are significantly improved.

19 Claims, 3 Drawing Sheets

MO-AU GOLD SEEDLAYER IN THIN FILM HEADS

This is a continuation-in-part application of the pending PCT patent application, Ser. No. PCT/US93/11571, filed Nov. 23, 1993.

BACKGROUND OF THE INVENTION

The present invention relates to the fabrication of thin film heads for data storage systems. More particularly, the invention relates to the deposition of a non-magnetic seedlayer adjacent to the magnetic core of a thin film magnetic head to reduce the effects of read instability. The same non-magnetic material also serves as gap material for the thin film head.

Thin film magnetic read/write heads are used for magnetically reading and writing information on a magnetic storage medium which moves relative to the head, such as a magnetic disc. A thin film magnetic head comprises a pair of "yokes" and "poles" which form the magnetic core of the head. Electrical conductors (or coils) pass between the core and are used for both reading and writing information onto the magnetic storage medium. During a write operation, electrical current is caused to flow through the coils generating a magnetic field in the core. A gap region occupies a small space between two pole tips of the magnetic core. The write current in the coils causes magnetic flux to span the gap region. This magnetic flux is then used to impress a magnetic field upon a storage medium producing a magnetic transition, which is then recorded. During the read operation, the magnetic head and the storage medium also move relative to one another, causing magnetic flux to link through the coils. Electrical signals in the coils may be sensed with electric circuitry which enable the recovery of information stored on the magnetic medium.

In thin film heads, the magnetic core serves as a link between the magnetic flux emanating from the transitions in the recording medium and the coils. In doing so, the magnetization of the core changes to reflect signal flux variations. The changing magnetic state of the core is characterized by either magnetic rotation or domain wall motion. In some cases, excitation of the write signal can cause domain walls in the core to move irreversibly.

During the demagnetization process, (i.e. after the termination of a write current pulse), the core may be left with undesirable domain patterns. More particularly, the core may be unable to relax back to a stable magnetic state. For readback, a stable magnetic state exists when the magnetic domains are oriented in an easy axis direction. Particular domain patterns, such as vertical walls in the pole tip region, are associated with a high degree of magnetic instability during readback. The inability of a magnetic head to return to a stable relaxed state may be caused by defects such as scratches, local stresses caused by the deposition process, or inhomogeneities in the composition of the core material in the head. In any case, if the domain patterns of the head vary significantly from the "desirable" relaxed magnetization state, the performance of the head is compromised.

One way in which the performance of a thin film magnetic head is degraded is by the effects associated with read instability. One effect of read instability is "head wiggle", which is a distortion of the read signal. The distortion primarily appears as noise on the trailing edge of the readback signal.

The occurrence of head wiggle causes incorrect data to be retrieved from the magnetic medium. The prior art does not adequately compensate for the effects of read instability in both the design and properties of material used in thin film head fabrication. An improved thin film head in which the effects of read instability are consistently reduced, would be a significant improvement to the art.

SUMMARY OF THE INVENTION

The present invention relates to the enhanced performance of a thin film head by minimizing the effects of read instability. The invention provides an improved thin film head and a method of fabricating the same. Specifically, each yoke/pole structure that forms the magnetic core is deposited on a non-magnetic seedlayer. A combination of elements, such as molybdenum (Mo) and gold (Au) (or Mo—Au), is a preferred nonmagnetic seedlayer. The presence of a non-magnetic seedlayer adjacent to the magnetic core structure of the thin film head results in less external magnetic force on the core than a magnetic seedlayer. Thus, the head with non-magnetic seedlayers is more likely to move into a relaxed stable read state after a write excitation. In other words, a thin film magnetic head with reinforcing non-magnetic seedlayers is less likely to experience domain wall "Barkhausen" jumps in the readback. The result is a magnetic head with a improvement in read performance. Further, the seedlayer thickness may be selected such that the non-magnetic seedlayer forms the gap itself.

DETAILED DESCRIPTION OF THE PREFERRED EMBODIMENTS

The present invention is directed to an improved thin film magnetic head and method of fabricating the same. The four main elements of a thin film head, in the order in which they are deposited, are the bottom magnetic yoke/pole, the flux gap material which provides spacing between the yoke/poles, one or more levels of electrical conducting coils interposed within insulation layers and a top magnetic yoke/pole. The present invention is directed to a seedlayer comprised of a non-magnetic material, such as Mo—Au under each magnetic yoke/pole. Unlike conventional magnetic seedlayers, the non-magnetic Mo—Au seedlayer does not exert a magnetic force on the core to induce, or push, the magnetic core to a "undesirable" demagnetized state. The non-magnetic seedlayer, if its thickness is properly selected, may serve as gap space.

Figure 1:
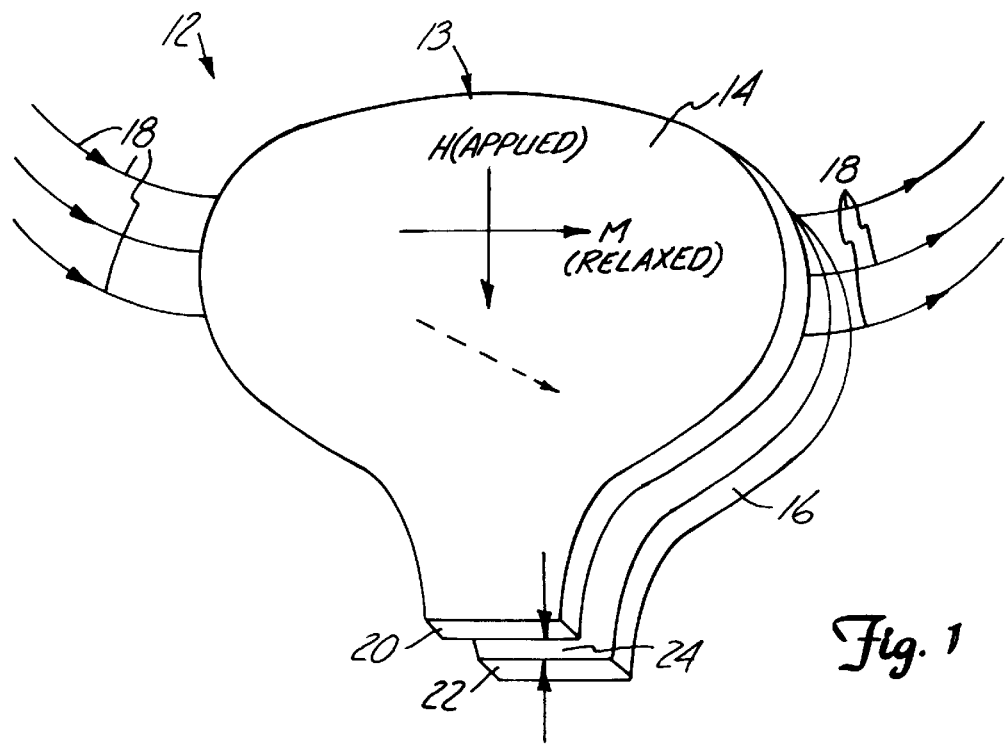
FIG. 1 is a plan view of a thin film magnetic read/write head.

FIG. 1 shows a plan view of thin film head 12 comprising core 13, including upper core piece 14 and lower core piece 16. Coil turns 18 extend through thin film head 12 and are sandwiched between upper core piece 14 and lower core piece 16. Upper core piece 14 includes upper core tip 20, while lower core piece 16 includes lower pole tip 22 (yokes are not shown in this view). Gap 24 is formed between upper pole tip 20 and lower pole tip 22. Typically, alumina fills the gap. A magnetic storage medium (not shown) may be placed near gap 24 such that information may be written on or read from the medium. FIG. 1 does not show any seedlayer.

Also shown in FIG. 1 is an arrow labeled H (Applied) indicating the direction of the applied magnetic field H, and an arrow labeled M (Relaxed) indicating the magnetization vector M of the thin film head 12 in its relaxed state. During operation, a magnetic storage medium, such as a magnetic disc, moves in the region near gap 24 formed between upper pole tip 20 and lower pole tip 22. As electrical current flows in coil turns 18 in the direction indicated, magnetic field H is applied to thin film head 12 in the direction shown by the arrow labeled H (Applied). This applied magnetic field causes magnetization vector M of the pole material to change direction from its easy axis direction, indicated by the arrow labeled M (Relaxed), to the direction indicated by the arrow formed by the dashed line labeled M (Resultant). As vector M (Resultant) is deflected away from the easy axis in the direction toward gap 24 and magnetic field H (Applied), upper pole tip 20 will become an increasingly strong north pole while lower pole tip 22 becomes the south pole. This causes a fringe field (not shown) to form around gap 24 with a magnetic field vector having a direction from upper pole tip 20 to lower tip 22.

In a similar manner, if the current through coil turns 18 were reversed from the direction indicated in the figure, upper pole tip 20 would become a south pole while lower pole tip 22 would become a north pole. This would cause a fringe field around gap 24 with a magnetic field in a direction from lower pole tip 22 to upper pole tip 20. Thus, it is possible by modulating the flow of the electrical current through coil turns 18 to control the magnetization of upper pole tip 20 and lower pole tip 22. Gap 24 emanates a fringe field which extends beyond the region of the gap. When a magnetic storage medium, such as a magnetic disc, is placed in this fringe field, information may be recorded by impressing the magnetic field upon the medium. Similarly, magnetization patterns impressed upon a storage medium passing through the fringe field region of thin film head 12 induce an electrical voltage across the coil turns 18, such that the stored information may be retrieved.

When data is not being written onto a magnetic medium, it is desirable for the magnetic domain pattern of thin film head 12 to be in an easy axis orientation, except for the edges. In other words, when there is no magnetic field H being applied to thin film head 12, the magnetization of thin film head 12 should be in its relaxed state, M (Relaxed). Often times, however, thin film heads exhibit an unstable magnetic domain pattern after the termination of a write process.

Figure 2:
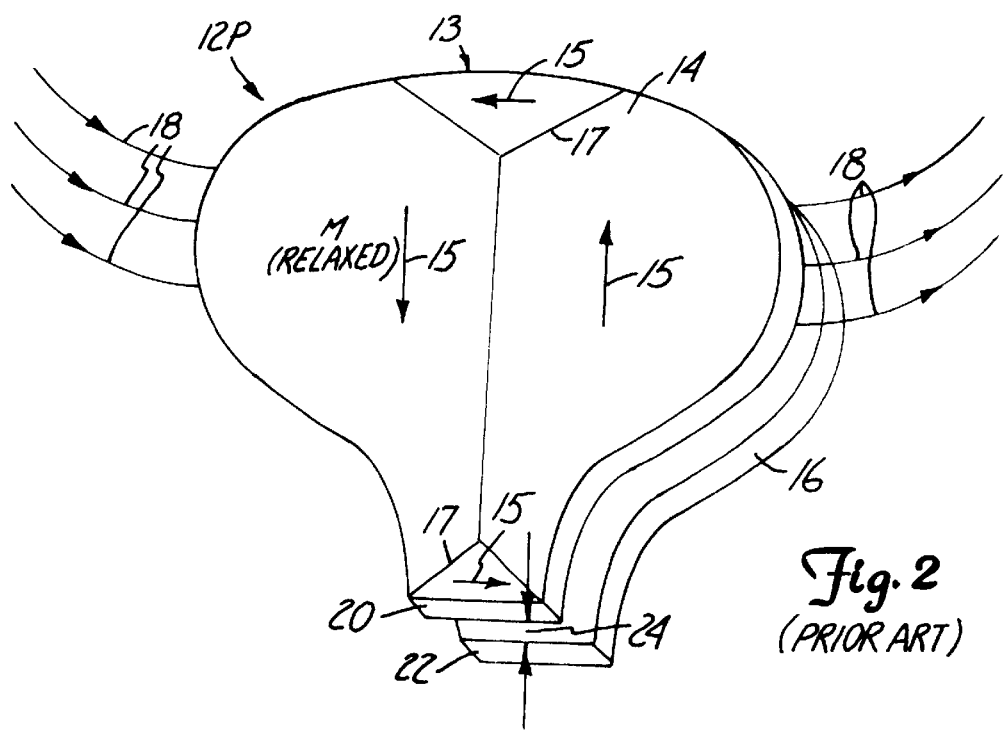
FIG. 2 is a plan view of a prior art thin film magnetic read/write head exhibiting an unstable magnetic domain pattern.

FIG. 2 diagrammatically shows an unstable prior art thin film head 12P with magnetic seedlayers. When current passed through coil turns 18, the direction of magnetization in the domains of upper core piece 14 were deflected away from the easy axis (not shown). After the current was terminated, upper core piece 14 did not return to a relaxed magnetic state. Arrows 15 indicate the direction of magnetization vectors in the magnetic domains across upper core piece 14 after the termination of the write current. Lines 17 indicate domain walls which exist after the termination of a write current. Upper core piece 14, as shown in FIG. 2, exhibits vertical domain wall 17A perpendicular to pole tip 20. The presence of domain wall 17A perpendicular to pole tip 20 can cause magnetic read instability. This instability causes head wiggle which significantly degrades readback performance.

Figure 3:
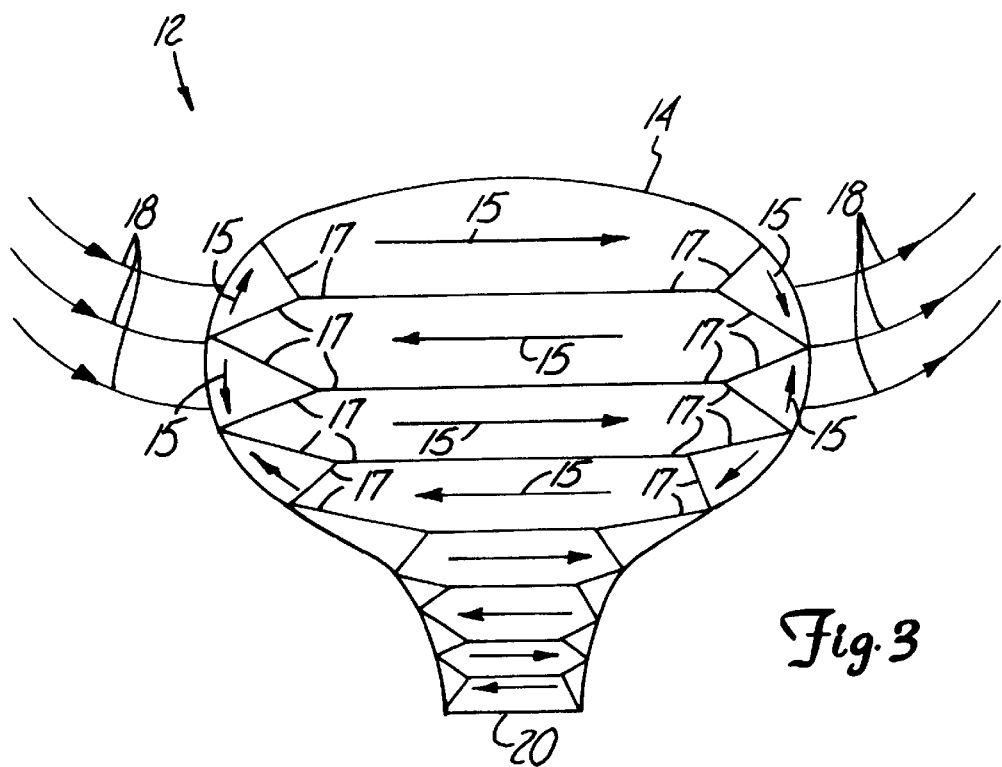
FIG. 3 is a plan view of a thin film magnetic read/write head exhibiting a stable magnetic domain pattern.

FIG. 3 diagrammatically shows a magnetically stable thin film head made with non-magnetic seedlayers, in accordance with the present invention. Thin film head 12 is shown including arrows 15 which indicate the direction of magnetization vectors M (Relaxed) in the magnetic domains across upper pole piece 14. Lines 17 show domain walls. Thin film head 12 is shown in its minimum energy relaxed state after removal of the write current. The orientation of the various magnetic domains shown in FIG. 3 is desirable because there are no vertical domain walls in or near top pole tip 20. The practical result of a magnetically stable core is less readback noise than that of prior art thin film head 12P shown in FIG. 2.

Figure 4:
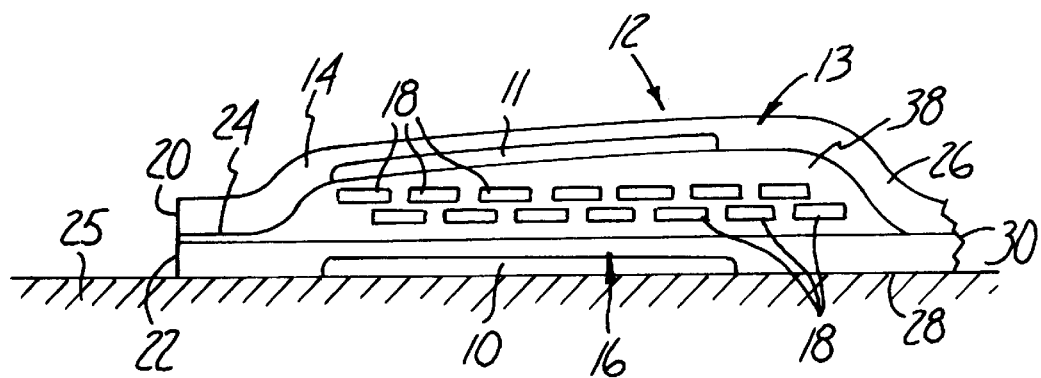
FIG. 4 is a cross-sectional view of a thin film magnetic read/write head made in accordance with the present invention as it appears on a slider.

FIG. 4 shows a cross-sectional view of thin film magnetic head 12 made in accordance with the present invention. Thin film head 12 includes substrate 25 and core 13. Core 13 comprises upper yoke 11, upper pole piece 14, lower yoke 10 and lower pole piece 16. Upper pole piece 14 and lower pole piece 16 form upper pole tip 20 and lower pole tip 22. Core 13 also includes rear upper portion 26 and rear lower portion 28. Upper pole piece 14 and lower pole piece 16 and rear upper and lower portions 26 and 28, respectively, meet at center 30.

Thin film head 12 uses two levels of core windings formed by coils 18. Both levels of coils 18 are wound around center 30 of core 13, with a portion of the winding being sandwiched between core 13. Typically, basecoat 36 is an insulator such as alumina, $Al_2O_3$. The area between core 13 is filled with insulating material 38. Insulating material 38 is the same non-magnetic material used to deposit seedlayers, in this case Mo—Au. Insulating material 38 is also sandwiched between rear upper and lower portions 26 and 28 of core 13. Core 13 is separated from substrate 25 by basecoat 36 (shown in FIG. 5). The present invention employs a non-magnetic seedlayer 37, such as Mo—Au, sandwiched between basecoat 36, pole 16 and yoke 10 respectively. Seedlayer 39 is sandwiched between insulator 38 and upper pole 13 and upper yoke 11 respectively. Gap 24 is same as upper seedlayer 39. During fabrication, multiple heads similar to thin film head 12 may be deposited across an entire surface of substrate 25. For the purposes of this example, however, only the fabrication of single thin film magnetic head 12, is shown.

Figure 5:
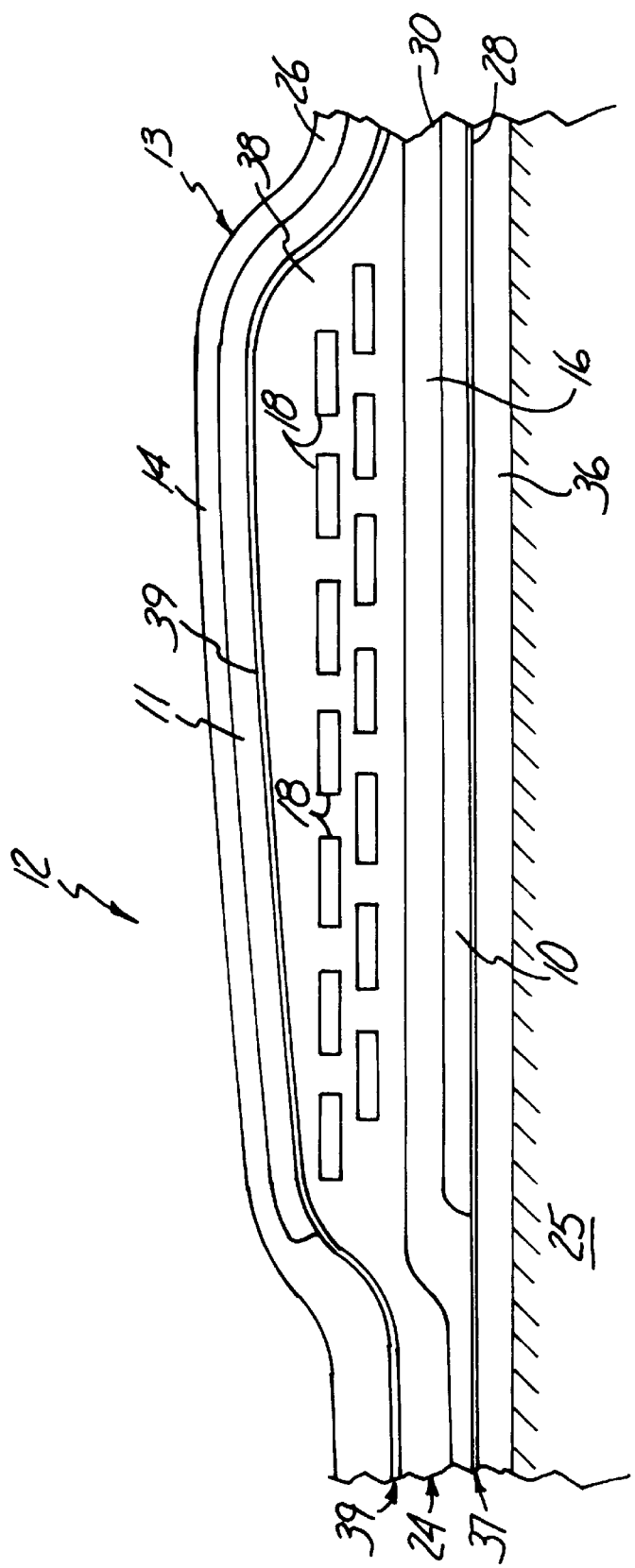
FIG. 5 is a cross-sectional view of the fabrication process of a thin film head made in accordance with the present invention.

FIG. 5 shows the fabrication process which begins with basecoat layer 36 being deposited across the entire surface of substrate 25 of a slider (not shown). Base coat 36 comprises a non-conductive alumina material and is usually applied with sputtering techniques. First nonmagnetic layer 37 is sandwiched between basecoat 36 and the bottom of magnetic core 13. Layer 37 serves as a foundation for the bottom of magnetic core 13. A thin film layer of magnetic material, such as permalloy, is applied across the surface of non-magnetic Mo—Au seedlayer 37. This thin film layer forms the bottom of magnetic core 13 including lower yoke 10, lower pole tip 22, lower rear portion 28 and part of center 30. Seedlayer Mo—Au is a double layer, where Mo serves to provide good adhesion to substrate and Au serves as electrically conducting layer during electrodeposition of the pole/yoke material. Using photolithographic techniques, insulating layer 38, which is comprised of Mo—Au, is deposited upon the bottom of core 13.

Next, coil turns 18 are deposited upon insulating layer 38 and are wound around center 30. Insulating layer 38 is built up to cover coil turns 18. Second non-magnetic seedlayer 39, also comprised of Mo—Au, is sandwiched between insulating layer 38 and the top magnetic core 13. Next, another layer of magnetic material, such as permalloy is deposited over the second non-magnetic seedlayer to form the top of magnetic core 13 including upper yoke 11, upper pole piece 14, rear upper portion 26 and a portion of center 30. All layers are deposited using either electrodeposition or sputtering techniques.

Tests of thin film magnetic heads made in accordance with the present invention show a reduction in the amount of head wiggle associated with read instability over prior art thin film heads which use magnetic seedlayers. Non-magnetic seedlayers 37 and 39 do not apply a magnetic force on magnetic core 13. Thus, magnetic core 13 is not influenced by external magnetic forces when returning to a relaxed state after write excitation. Further, deposition of the same non-magnetic material in the gap region simplifies the fabrication process. The present invention is suitable for transducers made of any type of magnetic material. The method may also be used in conjunction with other forms of data storage medium. The present invention results in an efficient, cost effective means to increase the magnetic stability of a transducer.

Although the present invention has been described with reference to preferred embodiments, workers skilled in the art will recognize that changes may be made in form and detail without departing from the spirit and scope of the invention.

What is claimed is:

1. A thin film head/slider assembly comprising:
  a substrate;
  a first non-magnetic seedlayer supported by the substrate;
  a bottom magnetic core piece positioned over and contacting the first non-magnetic seedlayer;
  a second non-magnetic seedlayer;
  a top magnetic core piece positioned over and contacting the second non-magnetic seedlayer; and
  a gap comprising a non-magnetic material sandwiched between at least a portion of the bottom core piece and at least a portion of the second non-magnetic seedlayer.

2. The thin film head of claim 1 wherein the non-magnetic gap material is the same composition and of same thickness as the non-magnetic seedlayer material adjacent to the top magnetic core piece.

3. The thin film head of claim 1 wherein the top and bottom core piece comprise a yoke and pole.

4. The thin film head of claim 1 wherein the first and second non-magnetic seedlayers are comprised of molybdenum and gold.

5. A thin film head assembly including a substrate, a bottom pole piece, a bottom yoke, a top pole piece, a top yoke, a gap comprising non-magnetic material between the top pole piece and the bottom pole piece, and insulating material enclosing conducting coils, the improvement comprising:
  a first non-magnetic seedlayer sandwiched between the substrate and the bottom pole and yoke pieces; and
  a second non-magnetic seedlayer sandwiched between the insulating material and the top yoke piece and between the non-magnetic material forming the gap and the top pole piece.

6. The thin film head of claim 5 wherein the first non-magnetic seedlayer extends along an entire length of the bottom pole and yoke pieces.

7. The thin film head of claim 5 wherein the second non-magnetic seedlayer extends along the entire length of the top pole and yoke pieces.

8. The thin film head of claim 5 wherein the first and second non-magnetic seedlayers are comprised of molybdenum and gold.

9. A method for making a thin film head assembly comprising:
  providing a substrate;
  depositing a first non-magnetic seedlayer on the substrate;
  forming a bottom portion of a magnetic core on the first non-magnetic seedlayer;
  depositing a non-magnetic material on at least a portion of the bottom portion of the magnetic core;
  depositing a second non-magnetic seedlayer on the non-magnetic material; and
  forming a top portion of the magnetic core on the second non-magnetic seedlayer, the non-magnetic material forming a gap for the thin film head assembly.

10. The method of claim 9 wherein depositing the first non-magnetic seedlayer comprises sputtering molybdenum and gold onto the substrate.

11. The method of claim 9 wherein depositing the second non-magnetic seedlayer comprises sputtering molybdenum and gold onto the insulating material of the thin film head.

12. The method of claim 9 wherein forming a bottom portion of the core on the first non-magnetic seedlayer comprises depositing a permalloy material onto the first non-magnetic seedlayer.

13. The method of claim 9 wherein forming the top portion of the core on the second non-magnetic seedlayer comprises depositing a permalloy material onto the second non-magnetic seedlayer.

14. The method of claim 9 wherein depositing the first and second non-magnetic seedlayers results in superior magnetic pole orientation of the bottom and top pole pieces.

15. The method of claim 9 further including forming a layer of insulating material enclosing conducting coils on a portion of the bottom portion of the magnetic core, and the step of depositing the second non-magnetic seedlayer includes depositing the second non-magnetic seedlayer on the insulating material.

16. The method of claim 15 wherein the step of depositing the second non-magnetic seedlayer comprises sputtering molybdenum and gold onto the non-magnetic material and on the insulating material of the thin film head.

17. The thin film head of claim 1 wherein the first non-magnetic seedlayer directly adjoins the bottom magnetic core piece at an air bearing surface of the thin film head.

18. The thin film head of claim 5 wherein the first non-magnetic seedlayer directly adjoins the bottom magnetic pole piece at an air bearing surface of the thin film head.

19. The method of claim 9 wherein the step of forming the bottom portion of the magnetic core on the first non-magnetic seedlayer is performed such that the bottom portion of the magnetic core directly adjoins the first non-magnetic seedlayer at an air bearing surface of the thin film head.

* * * * *